Dec. 15, 1964 J. HREBICEK Re. 25,697
SPRING SUSPENSION WITH LEVELLING MEANS
Original Filed July 1, 1959
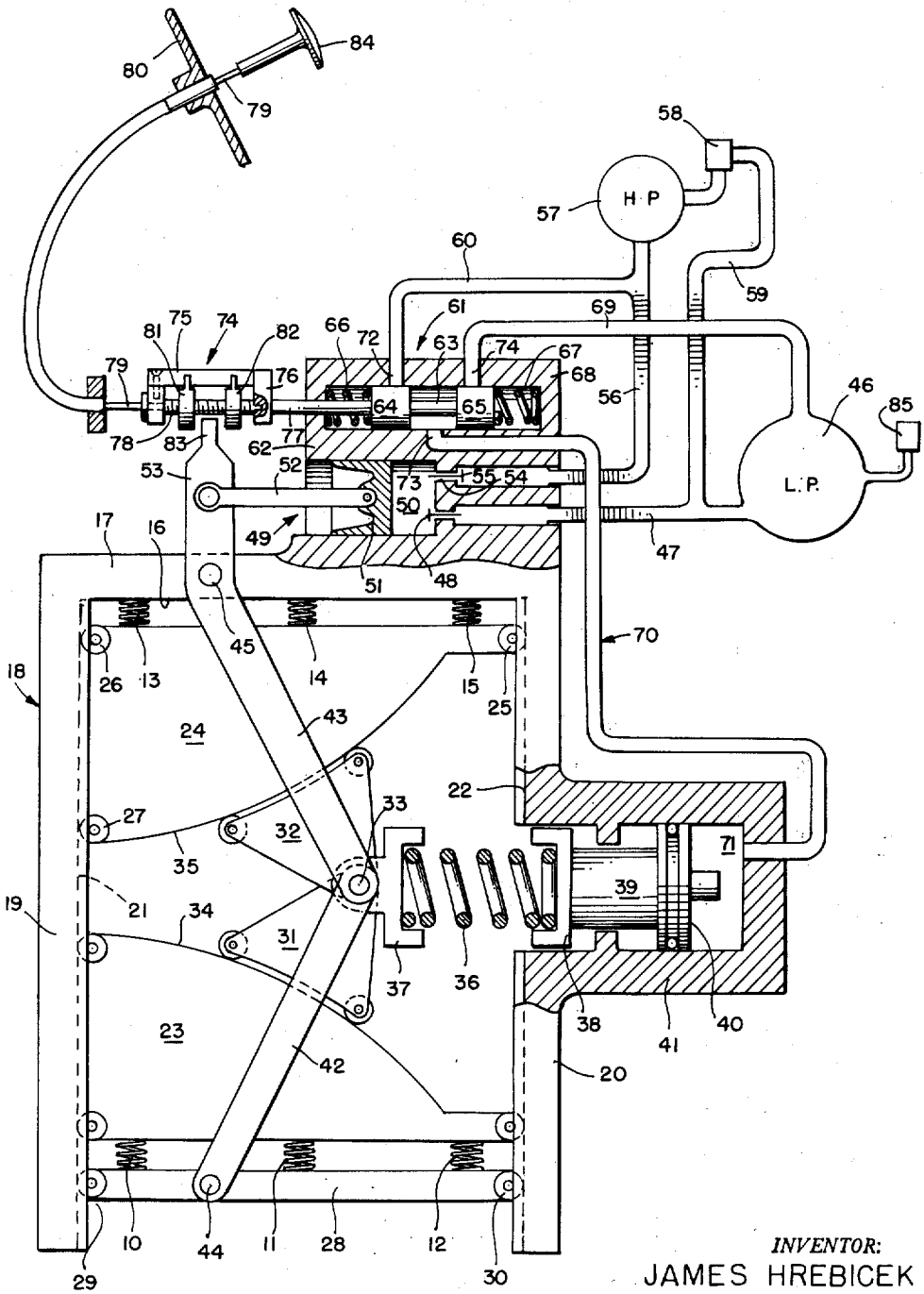
INVENTOR:
JAMES HREBICEK
BY
Charles F. Voytech
ATT'Y United States Patent Office Re. 25,697
Reissued Dec. 15, 1964

25,697

SPRING SUSPENSION WITH LEVELLING MEANS

James Hrebicek, 2327 61st Ave., Cicero, Ill.

Original No. 2,989,322, dated June 20, 1961, Ser. No. 824,414, July 1, 1959. Application for reissue June 17, 1963, Ser. No. 288,864
8 Claims. (Cl. 280—124)

Matter enclosed in heavy brackets [ ] appears in the original patent but forms no part of this reissue specification; matter printed in italics indicates the additions made by reissue.

This invention relates to an improvement in springs for supporting vehicles or the like.

It is desirable in vehicles to have the floor thereof level regardless of the amount and distribution of the load thereon. This is particularly true of passenger vehicles which are designed to have a low road clearance, since the presence of a large load concentrated over a single rear wheel will cause the vehicle to sink at that point so low as to leave an insufficient amount of clearance for normal road irregularities. Moreover, the lowering of the vehicle chassis at the rear raises the angle of the vehicle's headlights to cause an irremovable glare and increases the possibility of accidents.

One solution to this problem which has been proposed is to use inflatable, resilient bags as the springs for the vehicle, and to provide level sensing means for varying the pressure in the bags, whereby to control the expansion thereof and thus maintain a level condition in the chassis. This system requires the use of an air compressor driven from the engine, and the use of inflatable members which, if deprived of air under pressure through rupture or failure of air supply, collapse and destroy the resilient support for the vehicle chassis.

It is an object of this invention to provide a levelling device for a vehicle spring suspension system in which metallic springs are used so that should the levelling device fail, the vehicle will still be resiliently supported.

Another object of this invention is the provision of a hydraulically operated levelling device for a vehicle springing system, regardless of the type of spring employed therein in which the energy for developing pressure for the hydraulically operated levelling device is derived from the relative motion between the vehicle wheel axle and the vehicle chassis, thereby dispensing with an engine-driven pump and the loss of power in the vehicle engine occasioned thereby.

A further object of this invention is to provide a coil spring support for a vehicle or the like wherein a hydraulic levelling device is utilized to expand the springs automatically upon the compression thereof beyond a predetermined limit, with manually operable means for setting or altering the limit.

These and other objects of this invention will become apparent from the following detailed description when taken together with the accompanying drawing in which the sole figure depicts schematically a preferred embodiment of the invention.

For purposes of illustration this invention will be described with preference to an arrangement of springs such as is disclosed in my Patent No. 2,877,011 for Spring Suspension. The details of construction of the spring arrangement disclosed herein therefore will not be set forth, it being understood that reference may be had to my aforesaid patent for such details. It is understood further that the spring arrangement disclosed herein is merely typical of those to which this invention may be applied.

Referring now to the drawing, the spring arrangement there shown is comprised of two groups of coil springs, the lower group being shown at 10, 11 and 12 and the upper group being shown at 13, 14 and 15. The number of springs may be varied as desired for the specific application of the arrangement. The upper group 13, 14, 15 is compressed between the lower surface 16 of the horizontal bar 17 of a frame designated generally at 18, said frame being in the form of an inverted U and having depending sides 19 and 20. The inner surfaces 21 and 22 of the sides 19 and 20 are grooved to provide parallel tracks in which ride opposed pressure transmitting members 23 and 24. Said pressure transmitting members may be substantially identical in form and size, and each may be supplied with anti-friction rollers 25, 26, 27 which ride in the grooved sides 19 and 20 as shown in the drawing.

Frame 18 is designed to be connected to the load to be supported, and the support for the load is connected to a bar 28 extending across the bottom of the frame and having rollers 29, 30 at the ends thereof riding in grooved sides 21, 22. The lower group of springs 10, 11 and 12 is retained between bar 28 and pressure transmitting member 23.

Between members 23 and 24 are disposed triangular followers 31 and 32 which have a common pivot 33, the design of the details of construction of which is within the capability of one skilled in the art of machine design and hence is not set forth herein. The followers 31 and 32 ride respectively on curved tracks 34, 35 formed on the opposed edges of the members 23 and 24 and, through their common pivot 33, serve to transmit thrust from one of said members to the other.

The load to be supported by frame 18 may, in the case of a vehicle, be the vehicle chassis, and the support for the load, in such case, may be one of the wheels of the vehicle. Thus the exciting force for the springs is the vibration of the wheel as it rolls over an uneven pavement, and this force is transmitted through bar 28, springs 10, 11 and 12, member 23, follower 31, pivot 33, follower 32, member 24 and springs 13, 14 and 15 to horizontal bar 17 of frame 18.

The action of springs 10–15 is governed by two factors, the first of which is a horizontally disposed restraining spring 36, one end of which is retained in a socket 37 also pivoted on pivot 33, and the other end of which is retained in the end 38 of the piston rod 39 of a piston 40 reciprocable in a cylinder formed in side 20. The second factor is the disposition of the centers of rotation of a pair of arms 42, 43 with reference to the centers of curvature of the tracks 34, 35. Arm 42 is pivotally connected at one end 44 to bar 28 and at its other end is connected to pivot 33. Arm 43 is pivotally connected at one end 45 to horizontal bar 17 of frame 18 and at its other end is also connected to pivot 33.

It may be observed that with the spring arrangement constructed as described above, if the pivot 44 of arm 42 is not located at the center of curvature of track 34, oscillation of arm 42 about pivot 44 will cause a movement of member 23 toward and away from bar 28 to compress and release springs 10, 11 and 12. Similarly, if pivot 45 of arm 42 is not located at the center of curvature of track 35, oscillation of arm 43 about pivot 45 will result in a movement of member 24 toward and away from bar 17 to compress and release springs 13, 14 and 15. Obviously, the contour of the tracks and their disposition with reference to bars 28 and 17 will have a material effect upon the rate of movement of the members toward and away from their respective bars 28 and 17.

In operation, the spring arrangement thus far described permits bar 28 associated with a vehicle wheel to reciprocate toward and away from bar 17 connected to the vehicle frame, the movement being restrained by spring 36. The distance between bars 28 and 17 may be varied by changing the location of the followers 31, 32 on the tracks 34, 35, respectively for any given load. This may be accomplished by introducing fluid under pressure behind piston 40 to move the piston to the left as viewed in the drawing, the movement being transmitted through spring 36, somewhat diminished by the compression of said spring 36, to socket 37 and pivot 33. This, in turn, moves followers 31 and 32 to the left as viewed in the drawing along their respective tracks 34, 35, and since these tracks are arranged to converge toward the left as viewed in the drawing, the tendency will be to separate the members 23, 24. Since the load is substantially unchanged, this action will cause a separation of bars 28 and 17. The effect of such separation is to raise bar 17 and the vehicle chassis connected thereto relative to the wheel. If it be assumed that the piston 40 normally assumes a central position in its cylinder, then raising or lowering of the vehicle chassis is accomplished simply by moving piston 40 to the left or right, respectively, in cylinder 41 until the desired vehicle height above the wheel is attained.

The movement of piston 40 is attained as follows:

The fluid used to move piston 40 in the embodiment illustrated is oil which may be stored in a lower pressure reservoir or tank 46 suitably supported on the vehicle chassis (not shown). From tank 46 the oil passes through a pipe 47 to the intake valve 48 of a pump 49 which is preferably of the reciprocating piston type having a cylinder 50 in which is reciprocated a piston 51. The cylinder may be made integral with frame 18 or it may be formed separately and affixed to the chassis in any desired manner.

Piston 51 is connected through a rod 52 to an upwardly extending arm 53 which is an extension of pivoted arm 43. Arm 53, therefore, is oscillated about pivot 45 by arm 43 and the latter in turn is energized through arm 42 by reciprocation of bar 28 relative to bar 17 as the vehicle wheel secured to bar 28 moves over irregularities in the road. The reciprocations of piston 51 thus produced serve to create pressures in cylinder 50 which are alternately lower and higher than the pressure of the fluid in pipe 47 and hence valve 48 will alternately open and close in accordance with the principles of the ordinary force pump.

The outlet from cylinder 50 is shown at 54 and is controlled by a poppet valve 55, the fluid passing by valve 55 entering an outlet pipe 56 and thence flowing to a high pressure accumulator 57 which likewise may be secured to any part of the vehicle chassis. The pressure of the fluid in the accumulator 57 is regulated by a pressure regulating valve shown schematically at 58, and the excess flow from the regulating valve is returned through a pipe 59 to the intake pipe 47.

Fluid under pressure from accumulator 57 is directed through a pipe 60 to an inlet port 72 on a control valve 61 which for convenience may be mounted directly on the pump housing 62. Said valve 61 is shown schematically and may comprise a simple balanced spool valve 63 having spaced lands 64 and 65. A pair of opposed springs 66 and 67 serve to keep the spool 63 in a centered location in a valve housing 68, unless the spool is acted upon by external forces, as will be hereinafter described. The outlet passage from the valve 61 is shown at 69, said outlet passage conducting fluid from a vent port 74 back to the low pressure tank 46. The outlet from valve 61 is a combination of pipes and passages shown generally at 70 and it connects an outlet port 73 located at the central region between the lands 64 and 65 with the pressure chamber 71 of cylinder 41.

When spool 63 is shifted to the left, as viewed in the drawing, to uncover inlet port 72 in the valve housing 68, fluid under pressure is admitted to the valve through port 72 and is then directed through valve 63 to the outlet port 73, from which it is conducted through the combination of passages and pipes 70 to the pressure chamber 71. When the spool 63 is moved to the right as shown in the drawing to uncover vent port 74, fluid is then conducted from chamber 71 through the combination of pipes and passages 70 back through port 73 and out through the vent port 74 into pipe 69, whence it returns to the low pressure tank 46.

It may be apparent that when fluid under pressure is admitted to the pressure chamber 71 in cylinder 41, piston 40 will move to the left as viewed in the drawing and will exert a pressure upon spring 36 to move the socket 37 and the pivot point 33 in the same direction. This movement of pivot point 33 is accompanied by a movement of the followers 31 and 32 in the same direction which, because of the geometry of the device, results in a separation of the pressure-transmitting members 23 and 24, and this, in turn, results in a separation through the springs 10–15, of the bars 28 and 17. The chassis is thus raised with respect to the wheels whenever the piston 40 is moved to the left as viewed in the drawing. Conversely, the chasis is lowered with respect to the wheels when the piston 40 is moved in the opposite direction.

The position of valve 63 with respect to parts 72, 73 and 74 is controlled by the angular position of arm 53 relative to bar 17 through a connecting mechanism shown generally at 74. Said mechanism is comprised of a bracket 75 secured at one end 76 to the stem 77 of valve spool 63 so as to be movable axially with the valve. The bracket itself, however, is held against rotation in any suitable manner (not shown) so that it is constrained to move only in axial direction. A screw 78 is mounted in bracket 75 for rotation about its own axis, said screw 78 being secured in any suitable manner to a Bowden wire 79 extending upwardly to the dash 80 of the vehicle on which the above-described spring suspension and control mechanism is mounted. A pair of axially movable, non-rotatable abutments, 81 and 82, is threaded over screw 78 at a predetermined distance from one another to leave a space therebetween. Arm 53 terminates in a finger 83 which extends into the space between abutments 81 and 82 so as to be in a position to contact said abutments.

Should bar 17 be excessively loaded, springs 10–15 would be compressed, as would also spring 36, thereby causing arm 43 to rotate about its pivot 45 in a counter clockwise direction as viewed in the drawing, thereby moving finger 83 to the left as viewed in the drawing to contact and move abutment 81. Through the abutment and screw 78, the movement will be transmitted to bracket 75 and valve stem 77. Valve spool 63, therefore, will be moved to uncover port 72 and to allow fluid under pressure to move through the valve into port 73, passage 70 and to chamber 71 to move piston 40 to the left as viewed in the drawing. This movement of piston 40 will cause pivot 33 to move in the same direction and with it the followers 31 and 32 so that the members 23 and 24 are moved in a separating direction, the ultimate result of which is to move bar 17 up relative to bar 28. At the same time, arm 43 is moved clockwise as viewed in the drawing, thereby causing finger 83 to move to the right as shown in the drawing to contact and move abutment 82, bracket 74 and valve 63 in the same direction until the port 72 is cut off by land 64. Any fluid in pressure chamber 71 after the port 72 is cut off will remain there until there is again a major change in the loading on bar 17.

When the load is lightened on bar 17, the net effect will be to move valve 63 to the right as viewed in the drawing to uncover port 74 and thereby allow the fluid under pressure in pressure chamber 71 to bleed out and into outlet 59 and low pressure tank 46. This action will continue until the separation between bars 17 and 28 again reaches the normal or predetermined value, whereupon port 74 is closed and the remaining fluid in pressure chamber 71 is trapped therein to hold piston 40 against further movement.

It may be desired to change the elevation of the chassis either to secure greater road clearance or for some other reason. The elevation can be changed manually by rotating a knob 84 secured to Bowden wire 79 so that the latter and screw 78 are rotated with knob 84. This rotation of screw 78 causes abutments 81 and 82 to move along the screw in accordance with the direction of rotation of knob 84. The movement of the abutments relative to the bracket 75 when finger 83 is fixed has the effect of moving the valve spool 63 which then either admits fluid under pressure to chamber 71, or bleeds it therefrom as the case may be, to raise or lower the chassis.

The separation between abutments 81, 82 is preset at the time the mechanism 74 is assembled and may be readily changed thereafter by disassembling mechanism 74 and reassembling it with the abutments differently spaced. The precise structure used in mechanism 74 by which such change in spacing is effected is believed to be within the skill of the machine designed and is not described in detail herein. The spacing between abutments is so selected that valve 63 will not be moved while the finger 83 is oscillated through a predetermined range of movements corresponding to the normal wheel bounce on an average pavement. It is only when an additional movement resulting from a change in loading occurs that the valve is moved by finger 83.

It is contemplated that the fluid used in the system is oil and that the system is a closed system. However, a certain amount of leakage is inevitable and accordingly, the low pressure tank 46 is provided with an opening 85 through which make-up oil may be introduced into the system.

Where a plurality of springs is employed, as in a vehicle, a single low pressure tank 46 and a single accumulator 57 may be used in connection with all of the springs. Similarly, it may be desirable where a multiplicity of springs is used to omit the pump 49 on one or more of the additional springs for the sake of simplicity. It is also possible where a plurality of springs is used to provide a unified control at the dash for operating all of the springs, instead of having individual controls and knobs 84. Similarly, it is understood that other fluids than oil may be used and that the system can be adapted for use with air. It is believed, however, that such changes are within the capabilities of one skilled in the art, and hence these alternative designs likewise are not disclosed herein in detail.

It may be observed that the mechanism 74 is in effect an adjustable lost-motion device and that other known forms of lost-motion devices may therefore be substituted for the one shown. The arms 43 and 53 may be considered together to constitute a bell crank, and the valve 61, levers 43 and 53 and piston 40, with their respective connections, are a form of "follow-up" valve, and hence other well known forms of bell cranks and "follow-up" valves may be substituted for those described above.

It is understood that the foregoing description is merely illustrative of a preferred embodiment of the invention and that the scope of the invention therefore is not to be limited thereto but is to be determined by the following claims.

I claim:

1. In combination, a support comprising a relatively fixed element, an element movable relative to the fixed element, diverging tracks, means connecting a track to each element, follower means simultaneously contacting the diverging tracks and movable therealong to change the spacing between said elements, resilient means restraining movement of the follower means along the diverging tracks in one direction, pressure differential operated means mounted on the relatively fixed element and connected to the resilient means to act as a reaction abutment therefor, a source of fluid under pressure connected to the pressure differential operated means, a valve controlling application of fluid under pressure to the pressure differential operated means, means movable with the movable element, and means connecting the movable means to the valve for controlling the application of fluid under pressure to the pressure differential operated means in accordance with the movement of the movable element, whereby to change the location of the said abutment and thereby to control the spacing between the relatively fixed and movable elements.

2. A combination as described in claim 1, said means connecting the movable means to the valve comprising a lost motion connection whereby to render the connection effective to move the valve only when the means movable with the movable element moves beyond a predetermined range of movement.

3. A combination as described in claim 1, said means movable with the movable element comprising an arm pivoted intermediate its ends on the relatively fixed element and having one end pivotally connected to the follower means, the other end of the arm being connected to the means connecting the movable means to the valve.

4. A combination as described in claim 1, said means connecting the movable means to the valve comprising a bracket, a screw rotatable in the bracket, spaced non-rotatable abutments threaded on the screw, and manual means for turning the screw whereby to move the spaced abutments on the screw, and said movable means including a finger extending between said abutments to contact said abutments and thereby to move the valve.

5. A combination as described in claim 1, said source of fluid under pressure comprising a pump, an accumulator connected to the pump, and means connecting the pump to the means movable with the movable element whereby to energize the pump as an incident to the movement of the movable element.

6. In combination, a support comprising a relatively fixed element, an element movable relative to the fixed element, diverging tracks, means connecting a track to an element, follower means simultaneously contacting the diverging tracks and movable therealong to change the spacing between said elements, resilient means restraining movement of the follower means along the diverging tracks, said resilient means including a reaction abutment, means for shifting the location of the reaction abutment relative to the diverging tracks, and means provided on the relatively fixed element movable in response to movement of the movable element beyond a predetermined range of movement for rendering the shifting means operable.

7. In combination, a support comprising a relatively fixed element, an element movable relative to the fixed element, diverging tracks, means connecting a track to an element, follower means simultaneously contacting the diverging tracks and movable therealong to change the spacing between said elements, resilient means restraining movement of the follower means along the diverging tracks, said resilient means including a reaction abutment, means for shifting the location of the reaction abutment relative to the diverging tracks, means on the relatively fixed element movable in response to movement of the movable element beyond a predetermined range of movement for rendering the shifting means operable, and manually operable means for controlling the movement-responsive means to shift the limits of the range of movement.

*8. In combination a support for a load comprising a relatively fixed element, an element adapted to receive impulses of variable force and movable relative to the fixed element in response to such impulses, a pair of diverging curved tracks disposed between said elements, means connecting a track to each element, follower means simultaneously contacting both diverging curved tracks and movable therealong as the spacing between said elements changes in response to said variable force impulses transmitted from the movable element to the relatively*

*fixed element through said follower means, said follower means comprising a pair of frames, a pivot connecting said frames, a pair of spaced rollers on each frame, one pair of rollers riding on one curved track and the other pair of rollers riding on the other of said curved tracks, means urging said follower means against said diverging tracks, said urging means comprising a compression spring, a socket pivotally mounted on said pivot and adapted to receive one end of said spring to transmit the force of said spring to said pivot, an abutment against which the other end of said spring bears, and means connecting the abutment to the relatively fixed element, said last-mentioned connecting means being expandible to change the location of said other end of said spring relative to said relatively fixed element whereby to change the location of the follower means on the curved tracks*

*and thereby cause said follower to compress said spring at a different rate for a given increment of movement of the movable element.*

References Cited by the Examiner

The following references, cited by the Examiner, are of record in the patented file of this patent or the original patent.

UNITED STATES PATENTS

| | | | |
|---|---|---|---|
| 1,189,375 | 7/16 | Miller | 267—20 |
| 2,687,311 | 8/54 | Nallinger. | |
| 2,877,011 | 3/59 | Hrebicek | 267—20 |

A. HARRY LEVY, *Primary Examiner.*

LEO FRIAGLIA, PHILLIP ARNOLD, *Examiners.*